(12) United States Patent
Moriya et al.

(10) Patent No.: US 11,427,092 B2
(45) Date of Patent: Aug. 30, 2022

(54) ELECTRIC POWER SUPPLY SYSTEM

(71) Applicant: SUBARU CORPORATION, Tokyo (JP)

(72) Inventors: Fumiyuki Moriya, Tokyo (JP); Daisuke Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 426 days.

(21) Appl. No.: 16/738,791

(22) Filed: Jan. 9, 2020

(65) Prior Publication Data
US 2020/0307394 A1    Oct. 1, 2020

(30) Foreign Application Priority Data

Mar. 27, 2019    (JP) .............................. JP2019-059594

(51) Int. Cl.
*B60L 50/60* (2019.01)
*B60R 16/033* (2006.01)
*B60W 30/02* (2012.01)

(52) U.S. Cl.
CPC ............ *B60L 50/60* (2019.02); *B60R 16/033* (2013.01); *B60W 30/025* (2013.01)

(58) Field of Classification Search
CPC ..... B60L 50/60; B60R 16/033; B60W 30/025
USPC .......................................................... 701/22
See application file for complete search history.

(56) References Cited

FOREIGN PATENT DOCUMENTS

JP    2011-199920 A    10/2011

*Primary Examiner* — Hal Kaplan
(74) *Attorney, Agent, or Firm* — McGinn IP Law Group, PLLC

(57) ABSTRACT

An electric power supply system includes a battery, an electric power receiving apparatus, and a control apparatus. The electric power receiving apparatus is configured to receive external electric power transmitted from an external electric power source, and supply the external electric power to the battery. The control apparatus is configured to, in a case where the electric power receiving apparatus is able to receive the external electric power, permit a load driving mode of driving a load that is coupled to the battery in parallel with the electric power receiving apparatus. The control apparatus is configured to, in the load driving mode, execute function restriction control of restricting a function of the load to suppress input and output currents of the battery.

18 Claims, 7 Drawing Sheets

ELECTRIC POWER SUPPLY SYSTEM

CROSS-REFERENCE TO RELATED APPLICATIONS

The present application claims priority from Japanese Patent Application No. 2019-059594 filed on Mar. 27, 2019, the entire contents of which are hereby incorporated by reference.

BACKGROUND

The technology relates to an electric power supply system.

An electrically driven vehicle, such as an electric vehicle (EV) or a hybrid electric vehicle (HEV), is generally provided with a battery configured to store electric power to be supplied to a driving motor. In some electrically driven vehicles, the battery is chargeable with use of an external electric power source. Japanese Unexamined Patent Application Publication No. 2011-199920 discloses a technology related to an electric vehicle. The technology receives external electric power transmitted from an external electric power source, and supplies the external electric power to a battery to charge the battery.

SUMMARY

An aspect of the technology provides an electric power supply system including a battery, an electric power receiving apparatus, and a control apparatus. The electric power receiving apparatus is configured to receive external electric power transmitted from an external electric power source, and supply the external electric power to the battery. The control apparatus is configured to, in a case where the electric power receiving apparatus is able to receive the external electric power, permit a load driving mode of driving a load that is coupled to the battery in parallel with the electric power receiving apparatus. The control apparatus is configured to, in the load driving mode, execute function restriction control of restricting a function of the load to suppress input and output currents of the battery.

An aspect of the technology provides an electric power supply system including a battery, an electric power receiving apparatus, and a control apparatus. The electric power receiving apparatus is configured to receive external electric power transmitted from an external electric power source, and supply the external electric power to the battery. The control apparatus is configured to, in a case where the electric power receiving apparatus is able to receive the external electric power, permit a load driving mode of driving a load that is coupled to the battery in parallel with the electric power receiving apparatus. The control apparatus is configured to, in the load driving mode, increase a voltage of the electric power receiving apparatus in response to an increase in an output current of the battery, and reduce the voltage of the electric power receiving apparatus in response to an increase in an input current of the battery.

An aspect of the technology provides an electric power supply system including a battery, an electric power receiving apparatus, and circuitry. The electric power receiving apparatus is configured to receive external electric power transmitted from an external electric power source, and supply the external electric power to the battery. The circuitry is configured to, in a case where the electric power receiving apparatus is able to receive the external electric power, permit a load driving mode of driving a load that is coupled to the battery in parallel with the electric power receiving apparatus. The circuitry is configured to, in the load driving mode, execute function restriction control of restricting a function of the load to suppress input and output currents of the battery.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1:
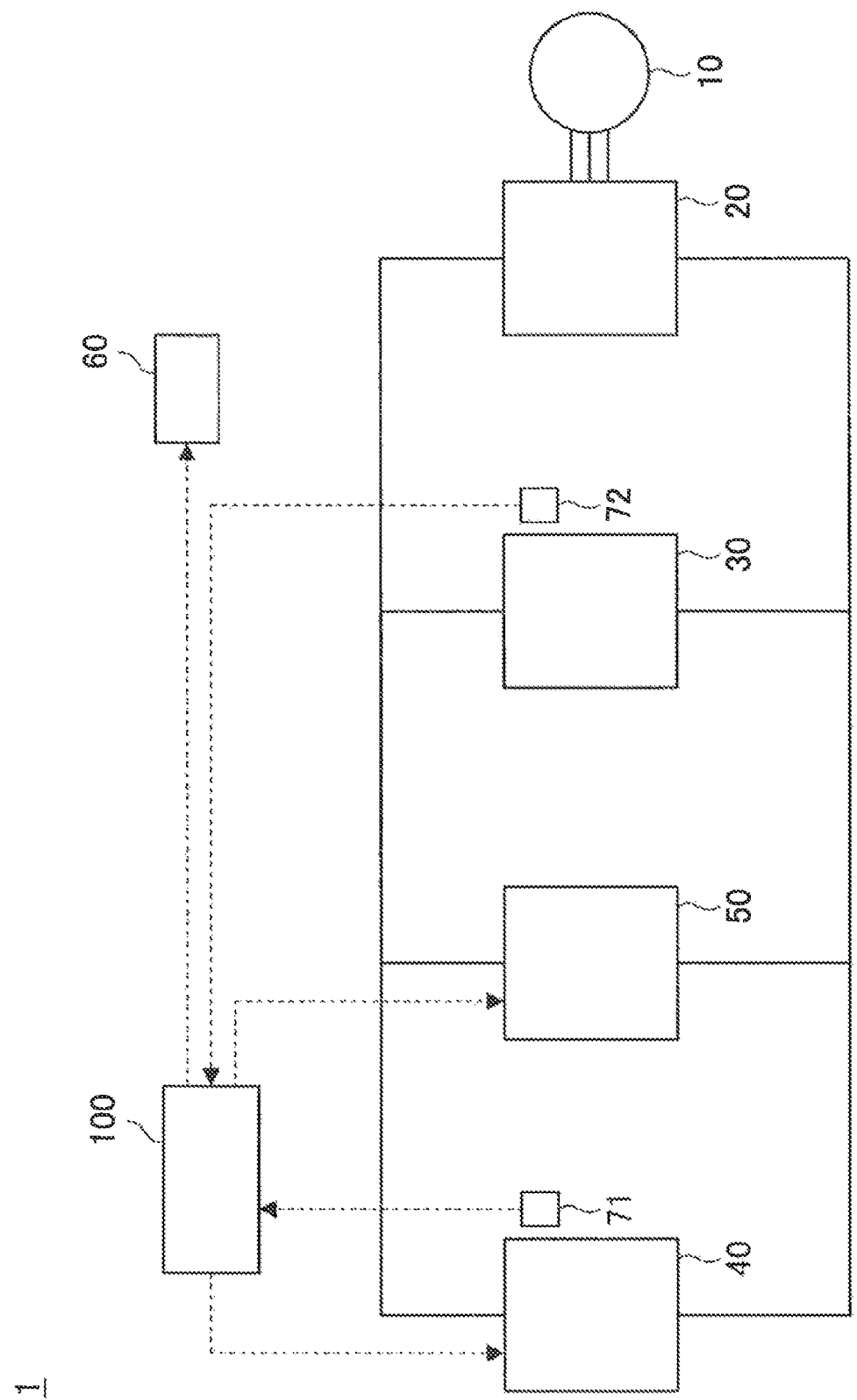
FIG. 1 is a schematic diagram illustrating an outline configuration of an electric power supply system according to one example embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

[1. Configuration of Electric Power Supply System]

Figure 2:
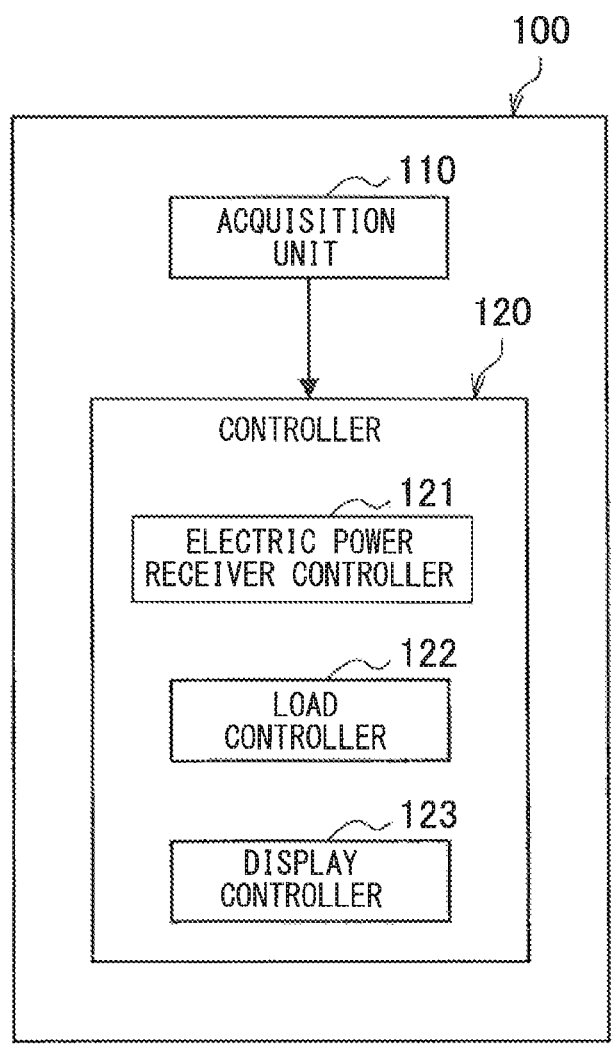
FIG. 2 is a block diagram illustrating an example of a configuration of a control apparatus according to the example embodiment.

With reference to FIGS. 1 and 2, description will be given on a configuration of an electric power supply system 1 according to one example embodiment of the technology. In one embodiment, the electric power supply system 1 may serve as an "electric power supply system".

FIG. 1 is a schematic diagram illustrating an outline configuration of the electric power supply system 1.

In one example, the electric power supply system 1 may be mounted on an electrically driven vehicle, such as an electric vehicle (EV) or a hybrid electric vehicle (HEV), and may be used to supply electric power to each apparatus in the vehicle. It is to be noted that the electrically driven vehicle may be any vehicle that includes a driving motor as a driving source and is caused to travel by torque of the driving motor, and examples may include a railway vehicle as well as an automobile.

As illustrated in FIG. 1, the electric power supply system 1 may include a driving motor 10, an inverter 20, a battery 30, an electric power receiver 40, a load 50, a display 60, an electric power receiver sensor 71, a battery sensor 72, and a control apparatus 100. The vehicle equipped with the electric power supply system 1 may travel by using the driving motor 10 as a driving source. In one embodiment, the battery 30 may serve as a "battery". In one embodiment, the electric power receiver 40 may serve as an "electric power receiving apparatus". In one embodiment, the load 50 may serve as a "load". In one embodiment, the control apparatus 100 may serve as a "control apparatus". In one embodiment, the display 60 may serve as a "reporting apparatus".

The driving motor 10 may be a motor that outputs motive power to be transmitted to a driving wheel, and may be, in one example, a polyphase alternating current (e.g., three-phase alternating current) motor. The driving motor 10 may be coupled to the battery 30 via the inverter 20, and may generate the motive power by using electric power supplied from the battery 30 via the inverter 20. The driving motor 10 may also serve as an electric power generator that regeneratively generates electric power by using rotational energy of the driving wheel when the vehicle decelerates.

The inverter 20 may be an electric power converter that is able to bidirectionally execute conversion between direct-current electric power and alternating-current electric power, and may include, in one example, a polyphase bridge circuit. The inverter 20 may be configured to convert direct-current electric power supplied from the battery 30 into alternating-current electric power, and supply the alternating-current electric power to the driving motor 10. The inverter 20 may also be configured to convert alternating-current electric power regeneratively generated by the driving motor 10 into direct-current electric power, and supply the direct-current electric power to the battery 30. The inverter 20 may be provided with a switching device, and the electric power conversion by the inverter 20 may be controlled by controlling operation of the switching device.

The battery 30 may be configured to store electric power to be supplied to the driving motor 10. As the battery 30, for example, a secondary battery may be used, such as a lithium ion battery, a lithium-ion polymer battery, a nickel-metal hydride battery, a nickel-cadmium battery, or a lead-acid battery.

The electric power receiver 40 may be coupled to the battery 30, and is able to receive external electric power transmitted from an external electric power source (i.e., an electric power source outside the vehicle equipped with the electric power supply system 1). Because the electric power supply system 1 is thus provided with the electric power receiver 40, it is possible to charge the battery 30 with the external electric power supplied from the external electric power source via the electric power receiver 40.

In one example, the electric power receiver 40 may be able to receive electric power transmitted from the external electric power source in a state of being physically coupled to the external electric power source. For example, the electric power receiver 40 may be provided with a transformer that is able to convert voltage. The transformer makes it possible to convert a voltage of the external electric power transmitted from the external electric power source. The electric power receiver 40 may also be provided with an electric power converter that is able to convert alternating-current electric power into direct-current electric power. The electric power converter makes it possible to, in a case where the external electric power source is an alternating-current electric power source, convert alternating-current external electric power transmitted from the external electric power source into direct-current electric power.

In another example, the electric power receiver 40 may be able to receive, in a noncontact manner, the external electric power transmitted from the external electric power source. In that case, for example, the electric power receiver 40 may be provided with an electric power receiving coil that is able to receive alternating-current external electric power transmitted from an electric power transmitting coil of the external electric power source, and an electric power converter that is able to convert the external electric power into direct-current electric power. As a method of transmitting electric power from the electric power transmitting coil to the electric power receiving coil, a magnetic resonance method or an electromagnetic induction method may be used, for example.

The load 50 may be coupled to the battery 30 in parallel with the electric power receiver 40. For example, an apparatus such as an air-conditioning apparatus or a car navigation apparatus may correspond to an example of the load 50.

FIG. 1 does not illustrate an element interposed between the battery 30, and the electric power receiver 40 and the load 50. However, for example, an element such as a relay that allows or cuts off electrical connection of the electric power receiver 40 and the load 50 to the battery 30 may be provided between the battery 30, and the electric power receiver 40 and the load 50.

The display 60 may be an apparatus that visually displays information. As the display 60, for example, a display may be used, such as a car navigation apparatus that guides a route to a destination desired by a driver, an apparatus that may display various images by using a technology referred to as head-up display (HUD), or a transmissive display to be overlaid on a windshield.

The electric power receiver sensor 71 may detect electrical quantities of state of the electric power receiver 40, and output the detected electrical quantities of state to the control apparatus 100. In one example, the electric power receiver sensor 71 may detect voltage and current of the electric power receiver 40, as the electrical quantities of state of the electric power receiver 40.

The battery sensor 72 may detect electrical quantities of state of the battery 30, and output the detected electrical quantities of state to the control apparatus 100. In one example, the battery sensor 72 may detect, as the electrical quantities of state of the battery 30, current values of input and output currents of the battery 30 (i.e., current inputted to the battery 30 and current outputted from the battery 30).

The control apparatus 100 may include a central processing unit (CPU), a read only memory (ROM), and a random access memory (RAM), for example. The CPU may be an arithmetic processing unit. The ROM may be a storage device that stores information such as programs and operation parameters to be used by the CPU. The RAM may be a storage device that temporarily stores parameters, for example, that change as appropriate in execution of the CPU.

The control apparatus 100 may communicate with each apparatus mounted on the electric power supply system 1. The control apparatus 100 may communicate with each apparatus by, for example, controller area network (CAN) communication.

It is to be noted that operations of the control apparatus 100 according to the example embodiment may at least partially be shared by a plurality of control apparatuses, or a plurality of operations may be implemented by one control apparatus. In a case where the operations of the control apparatus 100 are at least partially shared by a plurality of control apparatuses, the plurality of control apparatuses may be coupled to each other via a communication bus of CAN, for example.

For example, the control apparatus 100 may include an acquisition unit 110 and a controller 120, as illustrated in FIG. 2.

The acquisition unit 110 may acquire various kinds of information to be used in a process performed by the controller 120, and output the acquired information to the controller 120. For example, the acquisition unit 110 may communicate with the electric power receiver sensor 71 and the battery sensor 72 to acquire various kinds of information outputted from the respective sensors.

The controller 120 may control operation of each apparatus of the electric power supply system 1. For example, the controller 120 may include an electric power receiver controller 121, a load controller 122, and a display controller 123.

The electric power receiver controller 121 may control operation of the electric power receiver 40. For example, the electric power receiver controller 121 may control a voltage of the electric power receiver 40, by controlling supply of external electric power to the electric power supply system 1 by the electric power receiver 40. In one example, in a case where the electric power receiver 40 is provided with an electric power converter that is able to convert alternating-current electric power into direct-current electric power, it is possible for the electric power receiver controller 121 to control the external electric power supplied via the electric power receiver 40, by controlling operation of the electric power converter. In another example, the electric power receiver controller 121 may control the external electric power supplied via the electric power receiver 40, by outputting a control command to the external electric power source.

The load controller 122 may control operation of the load 50. In one example, the load controller 122 may drive or stop the load 50, by controlling electric power supply to the load 50. For example, it is possible for the load controller 122 to control the electric power supply to the load 50, by controlling operation of a switch (not illustrated), for example, that is able to adjust electric power supplied to the load 50.

The display controller 123 may control operation of the display 60. In one example, the display controller 123 may control display by the display 60, by outputting information indicating contents to be displayed to the display 60.

Here, in a state in which the electric power receiver 40 is able to receive power, the controller 120 is able to execute a load driving mode of permitting driving of the load 50. For example, the vehicle equipped with the electric power supply system 1 may be provided with an input apparatus, such as a button, directed to selecting execution or stop of the load driving mode. It is possible for the driver to select execution or stop of the load driving mode by operating the input apparatus. In a case where execution of the load driving mode is selected by the driver, the controller 120 may execute the load driving mode.

In the load driving mode, for example, it is possible to drive the load 50 by using the external electric power supplied via the electric power receiver 40. However, in the load driving mode, electric power stored in the battery 30 may be used to drive the load 50 in some cases. When the battery 30 is thus discharged, remaining capacity of the battery 30 decreases, in which case charging of the battery 30 may be performed. Therefore, in existing techniques, repetition of charging and discharging of the battery 30 in the load driving mode can promote deterioration of the battery 30.

In the electric power supply system 1 according to the example embodiment, the controller 120 executes, in the load driving mode, function restriction control of restricting a function of the load 50 to suppress the input and output currents of the battery 30. This makes it possible to suppress deterioration of the battery 30. A process related to such control directed to suppressing the input and output currents of the battery 30 during the execution of the load driving mode by the controller 120 will be described in detail later. This control is hereinafter referred to as input and output suppression control.

[2. Operation of Electric Power Supply System]

Now, with reference to FIGS. 3 to 8, description will be given on operation of the electric power supply system 1 according to the example embodiment of the technology.

[2-1. Flow of Overall Process]

First, with reference to FIGS. 3 to 7, description will be given on an example of a flow of an overall process related to the input and output suppression control performed by the control apparatus 100.

Figure 3:
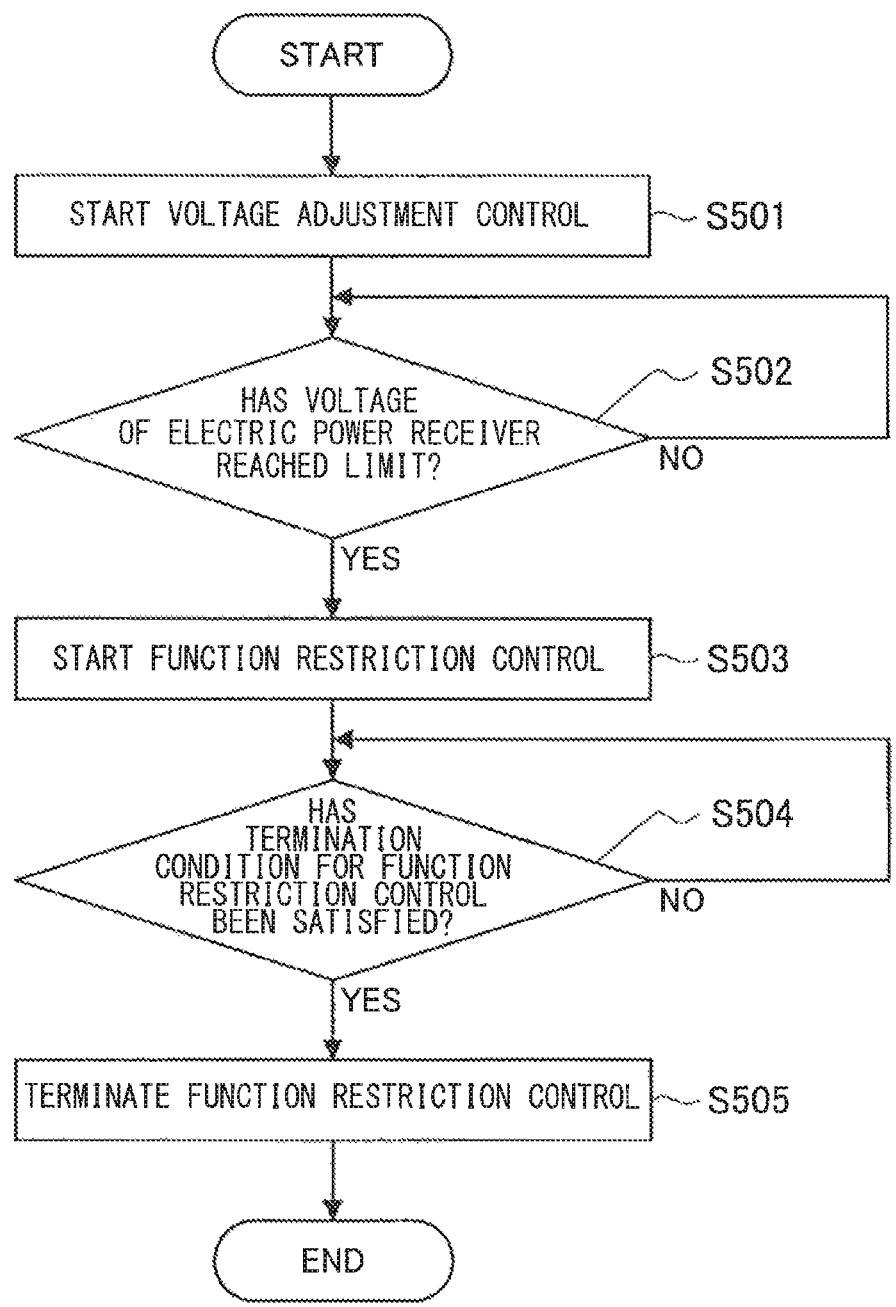
FIG. 3 is a flowchart illustrating an example of a flow of an overall process that is performed by the control apparatus according to the example embodiment.

FIG. 3 is a flowchart illustrating the example of the flow of the overall process performed by the control apparatus 100. In one example, the control flow illustrated in FIG. 3 may be repeatedly executed by the controller 120 during the execution of the load driving mode.

The control flow related to the input and output suppression control illustrated in FIG. 3 may be started in a case where a predetermined start condition is satisfied. The predetermined start condition may be, for example, that a specific input operation corresponding to start of the input and output suppression control has been performed by a user by using an input apparatus such as a switch, or that the remaining capacity of the battery 30 has reached a set value. The control flow related to the input and output suppression control illustrated in FIG. 3 may be terminated in a case where a predetermined termination condition is satisfied. The predetermined termination condition may be, for example, that a specific input operation corresponding to termination of the input and output suppression control has been performed by the user by using an input apparatus such as a switch, or that the remaining capacity of the battery 30 has fallen below a set value.

When the control flow illustrated in FIG. 3 is started, first, in step S501, the controller 120 may start voltage adjustment control. This brings about a state in which the voltage adjustment control is executed as the input and output suppression control. The voltage adjustment control may be control of adjusting the voltage of the electric power receiver 40 to suppress the input and output currents of the battery 30.

For example, it is possible for the controller 120 to perform the voltage adjustment control by using a result of detection by the electric power receiver sensor 71 and the battery sensor 72. In one example, in a case where the current value of the current outputted from the battery 30 has increased, the controller 120 is able to suppress the current outputted from the battery 30, by increasing the voltage of the electric power receiver 40. In a case where the current value of the current inputted to the battery 30 has increased, the controller 120 is able to suppress the current inputted to the battery 30, by reducing the voltage of the electric power receiver 40.

As described above, the voltage adjustment control makes it possible to suppress the input and output currents of the battery 30, which makes it possible to suppress fluctuations in the remaining capacity of the battery 30. This makes it possible to suppress repetition of charging and discharging of the battery 30, which makes it possible to suppress promotion of deterioration of the battery 30 due to the charging and discharging.

Thereafter, in step S502, the controller 120 may determine whether the voltage of the electric power receiver 40 has reached a limit (i.e., an upper limit or a lower limit of the voltage of the electric power receiver 40). If it is determined that the voltage of the electric power receiver 40 has reached the limit (step S502/YES), the control flow may proceed to step S503. If it is not determined that the voltage of the electric power receiver 40 has reached the limit (step S502/NO), the process in step S502 may be repeated.

For example, as larger electric power is consumed by the load 50, the voltage of the electric power receiver 40 has to be made higher to suppress the current outputted from the battery 30. Therefore, in a case where electric power consumed by the load 50 becomes excessively large, the voltage adjustment control may cause the voltage of the electric power receiver 40 to reach the upper limit.

If the determination result is YES in step S502, in step S503, the controller 120 may start the function restriction control. This brings about a state in which, as the input and output suppression control, the function restriction control is executed in addition to the voltage adjustment control. As described above, the function restriction control may be control of restricting the function of the load 50 to suppress the input and output currents of the battery 30.

For example, in a case where the load 50 includes a plurality of loads, in the function restriction control, the controller 120 may prohibit driving of some of the loads 50 to reduce the electric power consumed by the loads 50. This makes it possible to suppress the current outputted from the battery 30. In another example, in the function restriction control, in a case where one of the loads 50 has a plurality of functions, the controller 120 may stop some functions of the load to reduce the electric power consumed by the loads 50. This makes it possible to suppress the current outputted from the battery 30.

As described above, the function restriction control makes it possible to suppress the input and output currents of the battery 30, which makes it possible to suppress fluctuations in the remaining capacity of the battery 30. This makes it possible to suppress repetition of charging and discharging of the battery 30, which makes it possible to suppress promotion of deterioration of the battery 30 due to the charging and discharging.

Thereafter, in step S504, the controller 120 may determine whether a termination condition for the function restriction control has been satisfied. If it is determined that the termination condition for the function restriction control has been satisfied (step S504/YES), the control flow may proceed to step S505. If it is not determined that the termination condition for the function restriction control has been satisfied (step S504/NO), the process in step S504 may be repeated.

The termination condition for the function restriction control may be, for example, that the voltage of the electric power receiver 40 has fallen below a reference voltage. The reference voltage may be set to a value that allows appropriate determination of whether a requested value of the electric power consumed by the load 50 has decreased enough to prevent the voltage of the electric power receiver 40 from reaching the limit even if the function restriction control is terminated.

If the determination result is YES in step S504, in step S505, the controller 120 may terminate the function restriction control. This brings back the state in which only the voltage adjustment control is executed as the input and output suppression control.

Thereafter, the control flow illustrated in FIG. 3 may end.

Here, with reference to FIGS. 4 to 6, description will be given on transition of various quantities of state in a case where the above-described control flow illustrated in FIG. 3 is executed during the execution of the load driving mode.

Figure 4:
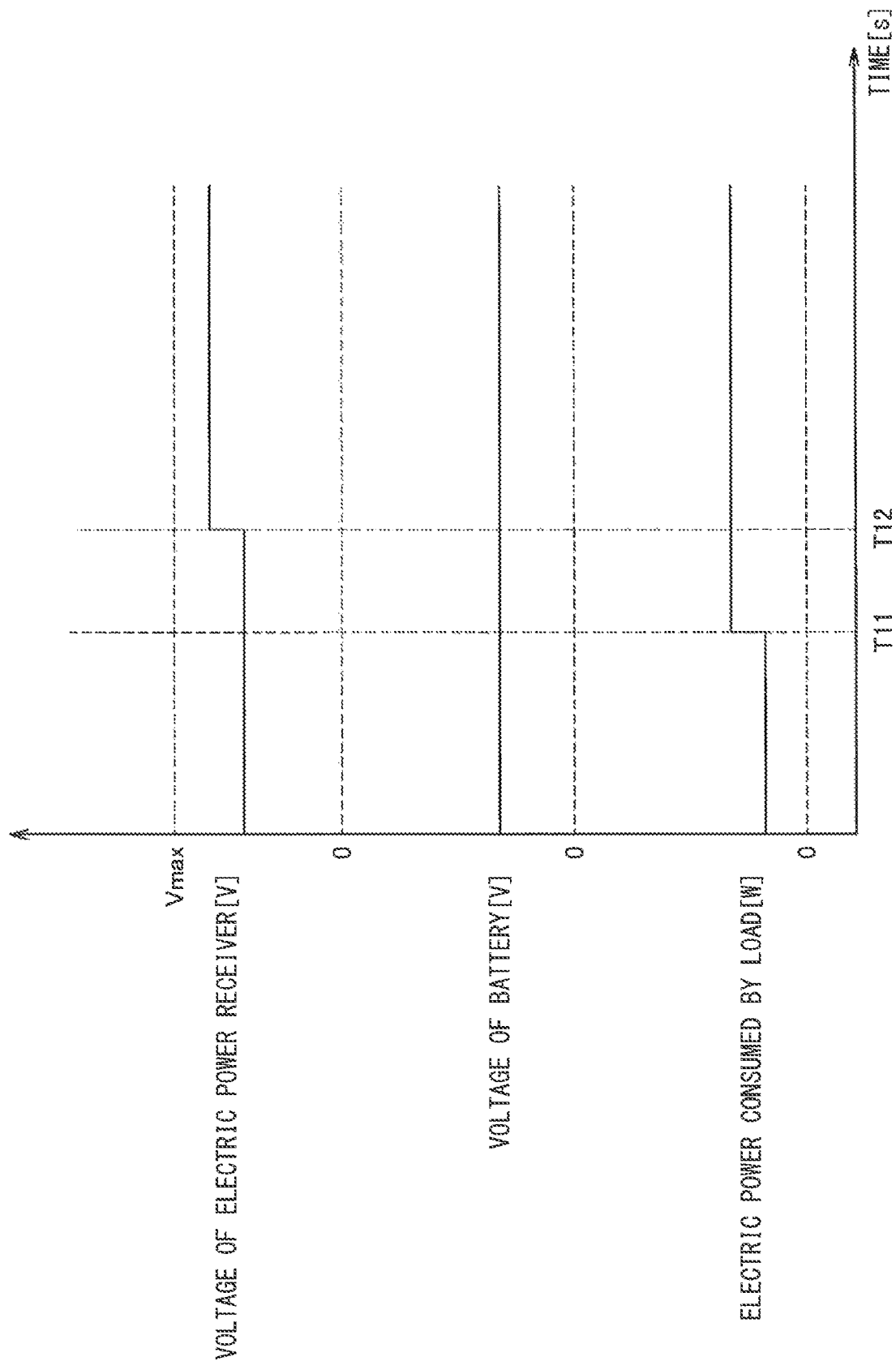
FIG. 4 is a diagram illustrating an example of transition of various quantities of state in a case where voltage adjustment control does not cause a voltage of an electric power receiver to reach a limit.

FIG. 4 is a diagram illustrating an example of transition of various quantities of state in a case where the voltage adjustment control does not cause the voltage of the electric power receiver 40 to reach the limit. For example, FIG. 4 illustrates, as the transition of the various quantities of state, transition of the voltage of the electric power receiver 40, a voltage of the battery 30, and the electric power consumed by the load 50.

For example, in the example illustrated in FIG. 4, the electric power consumed by the load 50 may have a substantially constant value before time T11. Here, before time T11, by execution of the voltage adjustment control, the voltage of the electric power receiver 40 may be adjusted to suppress the input and output currents of the battery 30. Consequently, the voltage of the battery 30 may be kept substantially constant. At time T11, the battery 30 may be discharged as the electric power consumed by the load 50 increases as illustrated in FIG. 4.

Figure 5:
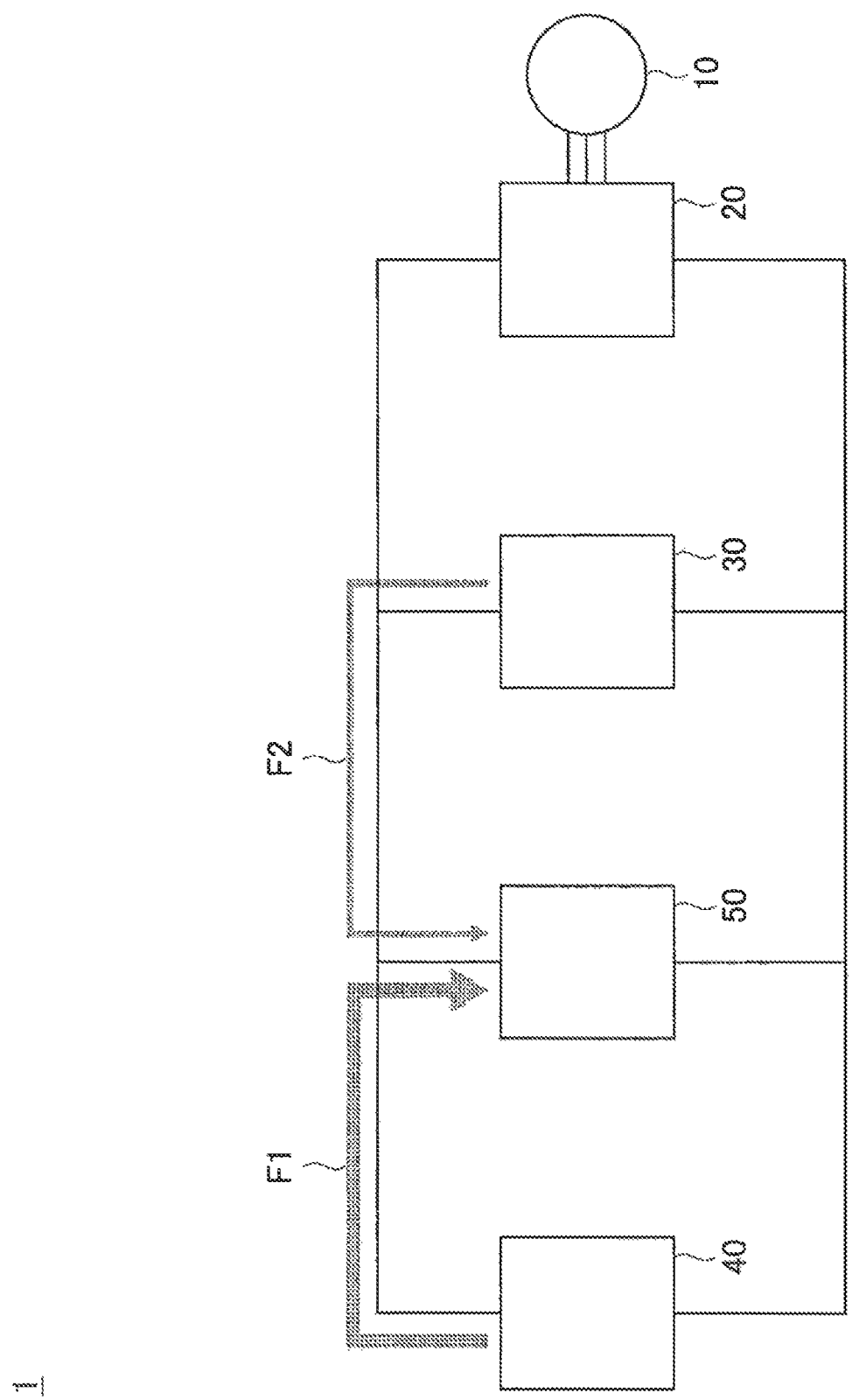
FIG. 5 is a diagram illustrating an example of how a battery is discharged as electric power consumed by a load increases.

FIG. 5 is a diagram illustrating an example of how the battery 30 is discharged as the electric power consumed by the load 50 increases in the electric power supply system 1.

During the execution of the load driving mode, for example, external electric power may be supplied from the electric power receiver 40 to the load 50, as indicated by an arrow F1 in FIG. 5. Here, the input and output currents of the battery 30 are basically suppressed during the execution of the voltage adjustment control. However, when the electric power consumed by the load 50 increases, electric power may temporarily be supplied from the battery 30 to the load 50, as indicated by an arrow F2 in FIG. 5.

As described above, in the voltage adjustment control, in a case where the current value of the current outputted from the battery 30 has increased, the controller 120 may increase the voltage of the electric power receiver 40. Therefore, as illustrated in FIG. 4, the voltage of the electric power receiver 40 increases at time T12 after time T11. Thus, even in a case where the electric power consumed by the load 50 fluctuates, it is possible to suppress the input and output currents of the battery 30. Therefore, as illustrated in FIG. 4, the voltage of the battery 30 may be kept substantially constant throughout a period from before time T11 to after time T12.

Figure 6:
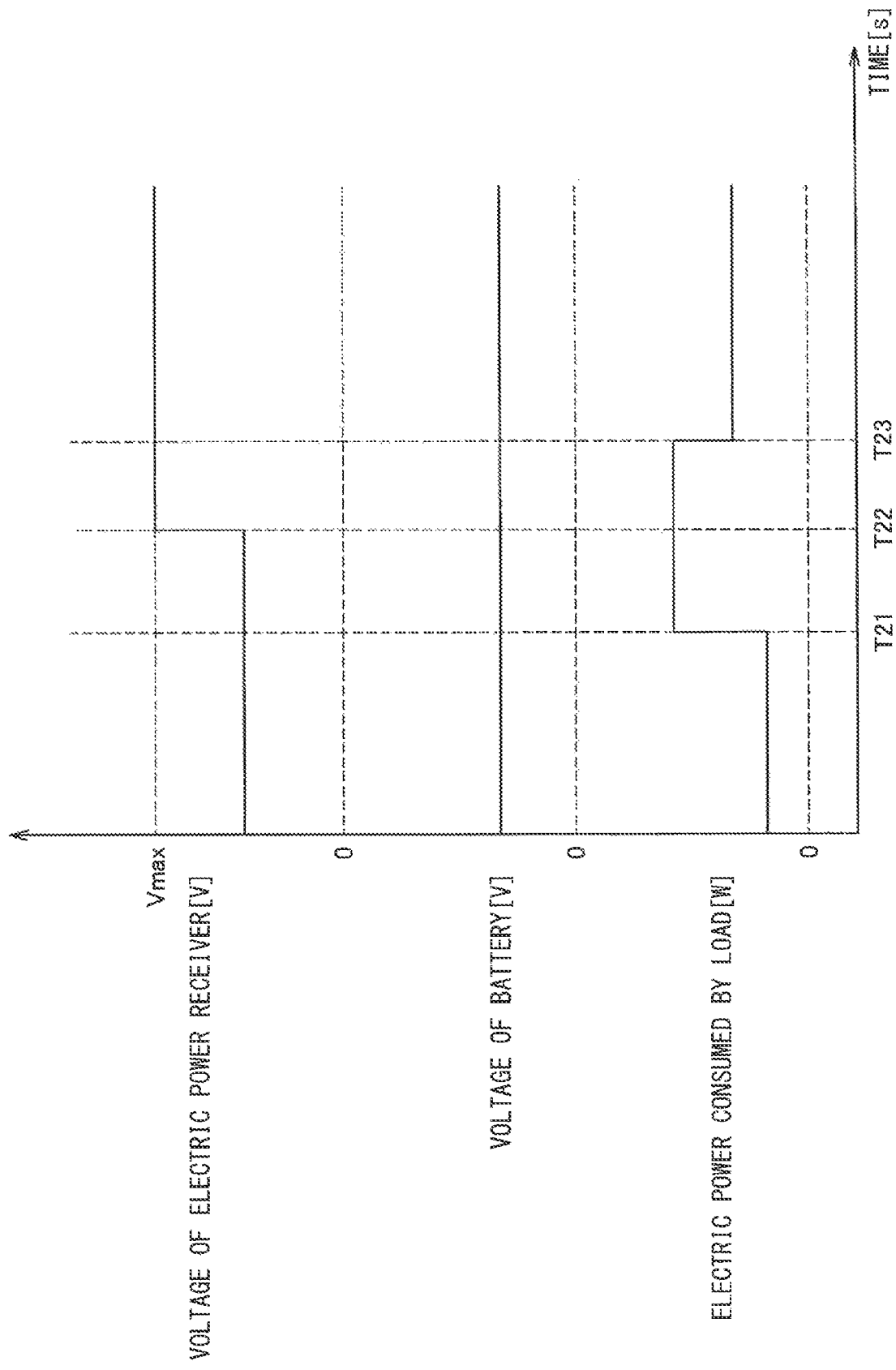
FIG. 6 is a diagram illustrating an example of transition of the various quantities of state in a case where the voltage adjustment control causes the voltage of the electric power receiver to reach the limit.

FIG. 6 is a diagram illustrating an example of transition of various quantities of state in a case where the voltage adjustment control causes the voltage of the electric power receiver 40 to reach the limit. For example, FIG. 6 illustrates, as the transition of the various quantities of state, transition of the voltage of the electric power receiver 40, the voltage of the battery 30, and the electric power consumed by the load 50, as in FIG. 4.

For example, in the example illustrated in FIG. 6, the electric power consumed by the load 50 may have a substantially constant value before time T21, as in the example illustrated in FIG. 4. Here, before time T21, by the execution of the voltage adjustment control, the voltage of the electric power receiver 40 may be adjusted to suppress the input and output currents of the battery 30. Consequently, the voltage of the battery 30 may be kept substantially constant. At time T21, the battery 30 may be discharged as the electric power consumed by the load 50 increases as illustrated in FIG. 6. Thus, at time T22 after time T21, the voltage adjustment control may cause the voltage of the electric power receiver 40 to increase.

Here, in the example illustrated in FIG. 6, a degree of increase in the electric power consumed by the load 50 at time T21 may be larger than a degree of increase in the electric power consumed by the load 50 at time T11 in the example illustrated in FIG. 4. Therefore, at time T22, the voltage of the electric power receiver 40 may reach an upper limit Vmax of the voltage. The voltage of the electric power receiver 40 reaching the upper limit Vmax of the voltage may trigger the controller 120 to start the function restriction control, and the electric power consumed by the load 50 may decrease at time T23 after time T22. In a case where the voltage adjustment control causes the voltage of the electric power receiver 40 to reach the limit, it is difficult to sufficiently suppress input and output electric power of the battery 30 by only the voltage adjustment control. However, by performing the function restriction control in such a case, it is possible to appropriately suppress the input and output electric power of the battery 30. Therefore, as illustrated in FIG. 6, the voltage of the battery 30 may be kept substantially constant throughout a period from before time T21 to after time T23.

As described above, in the control flow illustrated in FIG. 3, the controller 120 may execute, in the load driving mode, the voltage adjustment control more preferentially than the function restriction control. In one example, in the load driving mode, in a case where the voltage adjustment control causes the voltage of the electric power receiver 40 to reach the limit, the controller 120 may start the function restriction control. By thus executing the voltage adjustment control more preferentially than the function restriction control, it is possible to suppress deterioration of the battery 30, while suppressing the user's discomfort caused by the function of the load 50 being restricted by execution of the function restriction control.

Here, in terms of more effectively suppressing the user's discomfort caused by the function of the load 50 being restricted by the execution of the function restriction control, the controller 120 may, for example, in the load driving mode, permit or prohibit the function restriction control depending on a prediction result as to whether an increase in the electric power consumed by the load 50 is temporary. In one example, in the load driving mode, the controller 120 may permit the function restriction control in a case where the increase in the electric power consumed by the load 50 is not predicted to be temporary, and may prohibit the function restriction control in a case where the increase in the electric power consumed by the load 50 is predicted to be temporary.

Figure 7:
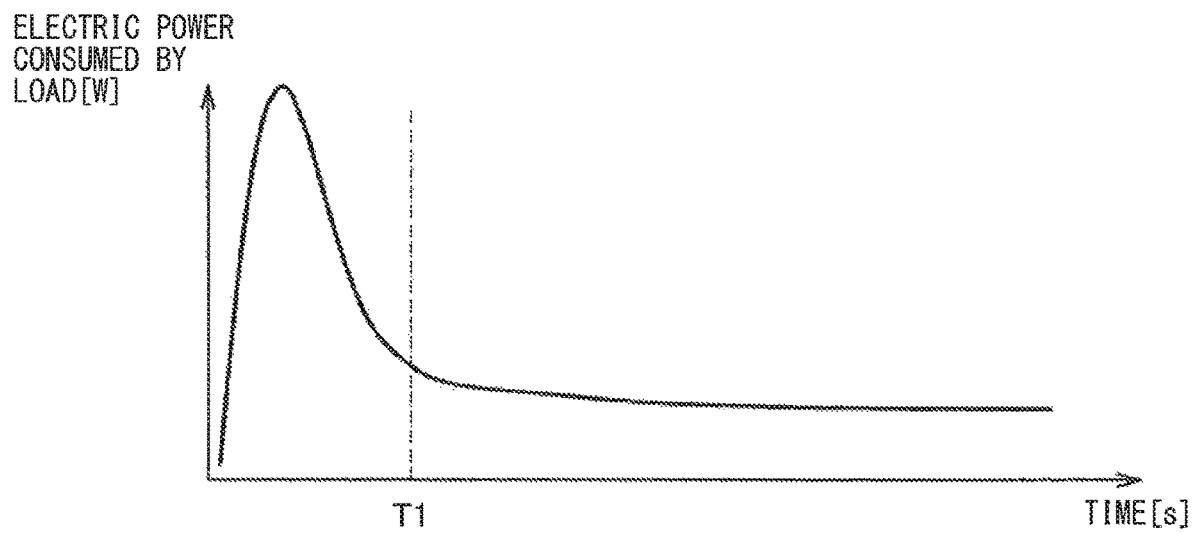
FIG. 7 is a diagram illustrating an example of transition of electric power consumed by the load in a case where an increase in electric power consumed by the load is temporary.

FIG. 7 is a diagram illustrating an example of transition of the electric power consumed by the load 50 in a case where an increase in the electric power consumed by the load 50 is temporary.

For example, in the example illustrated in FIG. 7, the electric power consumed by the load 50 may increase before time T1. However, the electric power consumed by the load 50 may abruptly drop immediately after abruptly rising, and may be kept at a relatively low value after time T1. For example, when a specific load, such as a positive temperature coefficient (PTC) heater, of the load 50 is driven, the electric power consumed by the load 50 may thus temporarily increase in some cases. Therefore, it is possible for the controller 120 to predict whether the increase in the electric power consumed by the load 50 is temporary on the basis of, for example, a type of the driven load of the load 50.

[2-2. Flow of Process During Execution of Function Restriction Control]

Now, with reference to FIG. 8, description will be given on an example of a flow of a process that is performed by the control apparatus 100 during the execution of the function restriction control.

Figure 8:
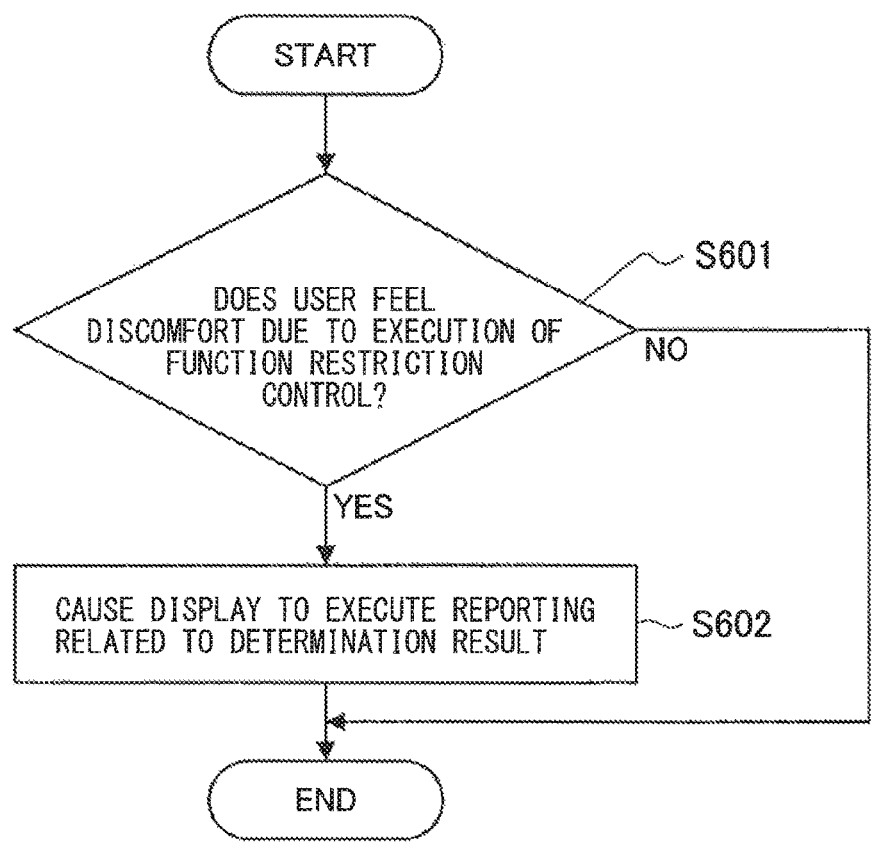
FIG. 8 is a flowchart illustrating an example of a flow of a process that is performed by the control apparatus in a case of determining whether a user feels discomfort.

FIG. 8 is a flowchart illustrating the example of the flow of the process performed by the control apparatus 100 during the execution of the function restriction control. In one example, the control flow illustrated in FIG. 8 may be repeatedly executed by the controller 120 while the function restriction control is being executed during the execution of the load driving mode.

When the control flow illustrated in FIG. 8 is started, first, in step S601, the controller 120 may determine whether the user feels discomfort due to the execution of the function restriction control. If it is determined that the user feels discomfort due to the execution of the function restriction control (step S601/YES), the control flow may proceed to step S602. If it is not determined that the user feels discomfort due to the execution of the function restriction control (step S601/NO), the control flow illustrated in FIG. 8 may end.

Here, as the function restriction control is continuously executed for a longer time, the user is more likely to feel discomfort caused by the function of the load 50 being restricted by the execution of the function restriction control. Therefore, in terms of appropriately determining whether the user feels discomfort due to the execution of the function restriction control, the controller 120 may determine that discomfort has been caused by the execution of the function restriction control, in a case where, for example, the function restriction control continues for a reference time. The reference time may be set to a time having a length enough to determine that the execution of the function restriction control causes the user to feel discomfort.

If the determination result is YES in step S601, in step S602, the controller 120 may cause the display 60 serving as a reporting apparatus to execute reporting related to the determination result.

In one example, the controller 120 may cause the display 60 serving as a reporting apparatus to report the determination result. For example, the display 60 may display an image indicating the determination that the user feels discomfort due to the execution of the function restriction control. Thus, if it is determined that the user feels discomfort due to the execution of the function restriction control, the determination result may be reported. This makes it possible to notify the user that the function restriction control is being executed, and that the user's discomfort is due to the function restriction control, which makes it possible to lessen the discomfort felt by the user.

Here, in terms of improving the user's convenience, the controller 120 may, for example, cause the display 60 serving as a reporting apparatus to report information directed to allowing the user to select whether to continue or prohibit the function restriction control. For example, the controller 120 may cause the display 60 to display an object directed to selecting continuation of the function restriction control and an object directed to selecting prohibition of the function restriction control. The function restriction control may be continued or prohibited depending on the object selected by the user.

Thereafter, the control flow illustrated in FIG. 8 may end.

The above description describes an example in which the display 60 is used as a reporting apparatus. However, in the reporting in step S602, the controller 120 may use another apparatus as the reporting apparatus that reports information. For example, the controller 120 may cause an audio output apparatus to execute reporting similar to that described above.

[3. Example Effects of Electric Power Supply System]

Now, example effects of the electric power supply system 1 according to the example embodiment of the technology will be described.

In the electric power supply system 1 according to the example embodiment, in a state in which the electric power receiver 40 is able to receive electric power, the controller 120 is able to execute the load driving mode of permitting driving of the load 50 that is coupled to the battery 30 in parallel with the electric power receiver 40. In the load driving mode, the controller 120 executes the function restriction control of restricting the function of the load 50 to suppress the input and output currents of the battery 30. This makes it possible to suppress fluctuations in the remaining capacity of the battery 30 in the load driving mode, making it possible to suppress repetition of charging and discharging of the battery 30. This makes it possible to suppress promotion of deterioration of the battery 30 due to the charging and discharging. This helps to suppress deterioration of the battery 30.

In the electric power supply system 1 according to the example embodiment, in the load driving mode, the controller 120 may further execute the voltage adjustment control of adjusting the voltage of the electric power receiver 40 to suppress the input and output currents of the battery 30. This makes it possible to more effectively suppress fluctuations in the remaining capacity of the battery 30 in the load driving mode, making it possible to more effectively suppress repetition of charging and discharging of the battery 30. This makes it possible to more effectively suppress promotion of deterioration of the battery 30 due to the charging and discharging. This helps to more effectively suppress deterioration of the battery 30.

In the electric power supply system 1 according to the example embodiment, in the load driving mode, the controller 120 may execute the voltage adjustment control more preferentially than the function restriction control. This makes it possible to suppress deterioration of the battery 30, while suppressing the user's discomfort caused by the function of the load 50 being restricted by the execution of the function restriction control.

In the electric power supply system 1 according to the example embodiment, in the load driving mode, the controller 120 may start the function restriction control in a case where the voltage adjustment control causes the voltage of the electric power receiver 40 to reach the limit. Thus, only the voltage adjustment control may be performed as the input and output suppression control under a situation in which it is possible to sufficiently suppress the input and output electric power of the battery 30 by only the voltage adjustment control. The function restriction control may be performed under a situation in which it is difficult to sufficiently suppress the input and output electric power of the battery 30 by only the voltage adjustment control. This makes it possible to appropriately suppress the input and output electric power of the battery 30. This makes it possible to appropriately suppress deterioration of the battery 30, while appropriately suppressing the user's discomfort caused by the function of the load 50 being restricted by the execution of the function restriction control.

In the electric power supply system 1 according to the example embodiment, in the load driving mode, the controller 120 may permit the function restriction control in a case where the increase in the electric power consumed by the load 50 is not predicted to be temporary, and prohibit the function restriction control in a case where the increase in the electric power consumed by the load 50 is predicted to be temporary. This makes it possible to suppress needless execution of the function restriction control in a case where the increase in the electric power consumed by the load 50 is temporary. This makes it possible to more effectively suppress the user's discomfort caused by the function of the load 50 being restricted by the execution of the function restriction control.

In the electric power supply system 1 according to the example embodiment, in the load driving mode, the controller 120 may determine whether the user feels discomfort due to the execution of the function restriction control. If it is determined that the user feels discomfort due to the execution of the function restriction control, the controller 120 may cause the reporting apparatus to report the determination result. This makes it possible to notify the user that the function restriction control is being executed, and that the user's discomfort is due to the function restriction control, which makes it possible to lessen the discomfort felt by the user.

In the electric power supply system 1 according to the example embodiment, in the load driving mode, the controller 120 may cause, if it is determined that the user feels discomfort due to the execution of the function restriction control, the reporting apparatus to report information directed to allowing the user to select whether to continue or prohibit the function restriction control. Thus, after the user is notified that the function restriction control is being executed, and that the user's discomfort is due to the function restriction control, it is possible for the user to select whether to continue or prohibit the function restriction control. This makes it possible to improve the user's convenience.

In the electric power supply system 1 according to the example embodiment, the controller 120 may determine that the user feels discomfort due to the execution of the function restriction control in a case where the function restriction control continues for the reference time. This makes it possible to appropriately determine whether the user feels discomfort due to the execution of the function restriction control.

[4. Conclusion]

As described above, in the electric power supply system 1 according to the example embodiment, in the load driving mode of permitting driving of the load 50 that is coupled to the battery 30 in parallel with the electric power receiver 40 in a state in which the electric power receiver 40 is able to receive electric power, the controller 120 executes the function restriction control of restricting the function of the load 50 to suppress the input and output currents of the battery 30. This makes it possible to suppress fluctuations in the remaining capacity of the battery 30 in the load driving mode, making it possible to suppress repetition of charging and discharging of the battery 30. This makes it possible to suppress promotion of deterioration of the battery 30 due to the charging and discharging. This helps to suppress deterioration of the battery 30.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For example, the above description describes the electric power supply system 1 with reference to FIG. 1, but the electric power supply system 1 illustrated in FIG. 1 is merely an example of an electric power supply system according to any embodiment of the technology. An electric power supply system according to any embodiment of the technology may be the electric power supply system 1 in FIG. 1 modified in a variety of ways as appropriate. Examples of such modification may include addition, deletion, and change of elements.

For example, for easy understanding, FIG. 1 does not illustrate an element interposed between the inverter 20 and the battery 30. However, an inverter switcher that allows or cuts off electrical connection between the inverter 20 and the battery 30 may be provided between the inverter 20 and the battery 30. In addition, a load switcher that allows or cuts off electrical connection of the electric power receiver 40 and the load 50 to the battery 30 may be provided between the battery 30, and the electric power receiver 40 and the load 50, as described above. It is to be noted that the inverter 20 and the driving motor 10 may be provided on the battery 30 side with respect to the load switcher, or may be provided on the load 50 side with respect to the load switcher. In a case where the inverter 20 and the driving motor 10 are provided on the load 50 side with respect to the load switcher, it is possible to share the inverter switcher and the load switcher, which makes it possible to reduce cost.

In addition, the processes described with reference to the flowcharts in this specification do not necessarily have to be executed in the order illustrated in the flowcharts. Furthermore, additional processing steps may be adopted, or some processing steps may be omitted.

The control apparatus 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the control apparatus 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the control apparatus 100 illustrated in FIG. 2.

Although the technology is described hereinabove in terms of example embodiments, it is not limited thereto. It should be appreciated that variations may be made in the described example embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this technology, the use of the terms first, second, etc. do not denote any order or importance, but rather the terms first, second, etc. are used to distinguish one element from another. The term "disposed on/provided on/formed on" and its variants as used herein refer to elements disposed directly in contact with each other or indirectly by having intervening structures therebetween. Moreover, no element or component in this technology is intended to be dedicated to the public regardless of whether the element or component is explicitly recited in the following claims.

The invention claimed is:

1. An electric power supply system comprising:
a battery;
an electric power receiving apparatus configured to receive external electric power transmitted from an external electric power source, and supply the external electric power to the battery; and
a control apparatus configured to, in a case where the electric power receiving apparatus is able to receive the external electric power, permit a load driving mode of driving a load that is coupled to the battery in parallel with the electric power receiving apparatus, the control apparatus being configured to, in the load driving mode, execute function restriction control of restricting a function of the load to suppress input and output currents of the battery.

2. The electric power supply system according to claim 1, wherein
the electric power supply system is mounted on a vehicle, and
the battery is configured to supply electric power to a driving motor of the vehicle.

3. The electric power supply system according to claim 2, wherein the control apparatus is configured to, in the load driving mode, further execute voltage adjustment control of adjusting a voltage of the electric power receiving apparatus to suppress the input and the output currents of the battery.

4. The electric power supply system according to claim 3, wherein the control apparatus is configured to, in the load driving mode, execute the voltage adjustment control more preferentially than the function restriction control.

5. The electric power supply system according to claim 4, wherein the control apparatus is configured to, in the load driving mode, start the function restriction control in a case where the voltage adjustment control causes the voltage of the electric power receiving apparatus to reach a limit.

6. The electric power supply system according to claim 2, wherein the control apparatus is configured to, in the load driving mode,
- determine whether a user feels discomfort due to the execution of the function restriction control, and
- activate a reporting apparatus for the user in a case where the discomfort is determined to be due to the execution of the function restriction control.

7. The electric power supply system according to claim 6, wherein the control apparatus is configured to, in the load driving mode, cause the reporting apparatus to report information prompting the user to select whether to continue or stop the execution of the function restriction control in a case where the discomfort is determined to be due to the execution of the function restriction control.

8. The electric power supply system according to claim 1, wherein the control apparatus is configured to, in the load driving mode, further execute voltage adjustment control of adjusting a voltage of the electric power receiving apparatus to suppress the input and the output currents of the battery.

9. The electric power supply system according to claim 8, wherein the control apparatus is configured to, in the load driving mode, execute the voltage adjustment control more preferentially than the function restriction control.

10. The electric power supply system according to claim 9, wherein the control apparatus is configured to, in the load driving mode, start the function restriction control in a case where the voltage adjustment control causes the voltage of the electric power receiving apparatus to reach a limit.

11. The electric power supply system according to claim 10, wherein the control apparatus is configured to, in the load driving mode,
- permit the execution of the function restriction control in a case where an increase in electric power consumed by driving of the load is not temporary, and
- prohibit the execution of the function restriction control in a case where the increase in the consumed electric power is temporary.

12. The electric power supply system according to claim 9, wherein the control apparatus is configured to, in the load driving mode,
- permit the execution of the function restriction control in a case where an increase in electric power consumed by driving of the load is not temporary, and
- prohibit the execution of the function restriction control in a case where the increase in the consumed electric power is temporary.

13. The electric power supply system according to claim 1, wherein the control apparatus is configured to, in the load driving mode,
- determine whether a user feels discomfort due to the execution of the function restriction control, and
- activate a reporting apparatus for the user in a case where the discomfort is determined to be due to the execution of the function restriction control.

14. The electric power supply system according to claim 13, wherein the control apparatus is configured to, in the load driving mode, cause the reporting apparatus to report information prompting the user to select whether to continue or stop the execution of the function restriction control in a case where the discomfort is determined to be due to the execution of the function restriction control.

15. The electric power supply system according to claim 14, wherein the control apparatus is configured to determine that the discomfort is due to the execution of the function restriction control in a case where the function restriction control continues for a reference time or more.

16. The electric power supply system according to claim 13, wherein the control apparatus is configured to determine that the discomfort is due to the execution of the function restriction control in a case where the function restriction control continues for a reference time or more.

17. An electric power supply system comprising:
- a battery;
- an electric power receiving apparatus configured to receive external electric power transmitted from an external electric power source, and supply the external electric power to the battery; and
- a control apparatus configured to, in a case where the electric power receiving apparatus is able to receive the external electric power, permit a load driving mode of driving a load that is coupled to the battery in parallel with the electric power receiving apparatus, the control apparatus being configured to, in the load driving mode, increase a voltage of the electric power receiving apparatus in response to an increase in an output current of the battery, and reduce the voltage of the electric power receiving apparatus in response to an increase in an input current of the battery.

18. An electric power supply system comprising:
- a battery;
- an electric power receiving apparatus configured to receive external electric power transmitted from an external electric power source, and supply the external electric power to the battery; and
- circuitry configured to, in a case where the electric power receiving apparatus is able to receive the external electric power, permit a load driving mode of driving a load that is coupled to the battery in parallel with the electric power receiving apparatus, the circuitry configured to, in the load driving mode, execute function restriction control of restricting a function of the load to suppress input and output currents of the battery.

* * * * *